(12) United States Patent
Freund et al.

(10) Patent No.: US 12,145,605 B2
(45) Date of Patent: Nov. 19, 2024

(54) METHOD FOR OPERATING A BRAKE SYSTEM, BRAKE SYSTEM AND CONTROL SYSTEM

(71) Applicant: ZF Active Safety GmbH, Koblenz (DE)

(72) Inventors: Christian Freund, Melsbach (DE); Frank Heller, Boppard (DE)

(73) Assignee: ZF Active Safety GmbH, Koblenz (DE)

( * ) Notice: Subject to any disclaimer, the term of this patent is extended or adjusted under 35 U.S.C. 154(b) by 254 days.

(21) Appl. No.: 17/959,432

(22) Filed: Oct. 4, 2022

(65) Prior Publication Data
US 2023/0115299 A1 Apr. 13, 2023

(30) Foreign Application Priority Data
Oct. 8, 2021 (DE) .......................... 102021126228.3

(51) Int. Cl.
| | |
|---|---|
| *B60T 7/12* | (2006.01) |
| *B60T 7/22* | (2006.01) |
| *B60T 8/1755* | (2006.01) |
| *B60T 8/32* | (2006.01) |
| *B60T 13/74* | (2006.01) |
| *B60W 50/02* | (2012.01) |
| *B60W 50/023* | (2012.01) |

(52) U.S. Cl.
CPC ............ *B60W 50/023* (2013.01); *B60T 7/12* (2013.01); *B60T 7/22* (2013.01); *B60T 8/1755* (2013.01); *B60T 8/3275* (2013.01); *B60T 13/745* (2013.01); *B60W 50/0205* (2013.01); *B60T 2201/022* (2013.01); *B60T 2201/10* (2013.01); *B60T 2270/402* (2013.01); *B60T 2270/413* (2013.01)

(58) Field of Classification Search
None
See application file for complete search history.

(56) References Cited

U.S. PATENT DOCUMENTS

| | | | | |
|---|---|---|---|---|
| 10,875,511 | B2* | 12/2020 | VandenBerg, III | ....... B60T 8/94 |
| 11,052,889 | B2* | 7/2021 | Wulf | ....................... B60T 8/885 |
| 11,167,751 | B2* | 11/2021 | Liu | ......................... G01C 21/28 |
| 11,407,394 | B2* | 8/2022 | Hutchins | ............... F16H 63/486 |
| 11,643,110 | B2* | 5/2023 | Hecker | ............. B60W 60/0016 |
| | | | | 701/26 |

(Continued)

FOREIGN PATENT DOCUMENTS

| | | | | |
|---|---|---|---|---|
| CN | 111836745 | A | * 10/2020 | ............ B60T 8/1755 |
| CN | 112193183 | A | * 1/2021 | ............... B60Q 1/34 |

(Continued)

*Primary Examiner* — Kevin R Steckbauer
(74) *Attorney, Agent, or Firm* — Kristin L. Murphy

(57) ABSTRACT

In a method for operating a brake system of a vehicle during autonomous driving of the vehicle, a presence of status information relating to a driving command unit which controls the autonomous driving is checked by a brake control unit of the brake system. If the brake control unit detects that the status information is missing or detects status information which indicates an error of the driving command unit, a control signal which controls the autonomous driving in the longitudinal and/or transverse direction is generated by the brake control unit from current environmental data and/or driving parameters.

20 Claims, 2 Drawing Sheets

(56) References Cited

U.S. PATENT DOCUMENTS

| | | | |
|---|---|---|---|
| 11,951,963 B2* | 4/2024 | Hwang | B60T 7/12 |
| 11,987,228 B2* | 5/2024 | Adler | B60T 8/17 |
| 2016/0114779 A1* | 4/2016 | Binder | B60T 8/171 |
| | | | 701/76 |
| 2019/0118786 A1* | 4/2019 | Wulf | B60T 13/683 |
| 2019/0168724 A1* | 6/2019 | VandenBerg, III | B60T 8/171 |
| 2020/0148183 A1* | 5/2020 | Brok | B60T 13/168 |
| 2020/0164893 A1* | 5/2020 | Orlov | B60W 50/04 |
| 2020/0231142 A1* | 7/2020 | Liu | G01S 13/931 |
| 2020/0369246 A1* | 11/2020 | Brand | B60T 13/20 |
| 2020/0406869 A1* | 12/2020 | Hwang | B60T 17/22 |
| 2021/0009162 A1* | 1/2021 | Hecker | B62D 11/08 |
| 2021/0277995 A1* | 9/2021 | Hutchins | B60T 8/885 |
| 2021/0323522 A1* | 10/2021 | Adler | B60T 7/02 |
| 2022/0080935 A1* | 3/2022 | Terada | B60T 8/92 |
| 2022/0314946 A1* | 10/2022 | Brok | B60T 8/94 |
| 2022/0314953 A1* | 10/2022 | Brok | B60T 13/745 |
| 2022/0363274 A1* | 11/2022 | McGregor | B60W 10/20 |
| 2023/0065689 A1* | 3/2023 | Bubeck | B60T 17/221 |
| 2023/0115299 A1* | 4/2023 | Freund | B60T 7/22 |
| | | | 701/70 |
| 2023/0150459 A1* | 5/2023 | Koeth | B60T 13/662 |
| | | | 303/113.1 |
| 2023/0159042 A1* | 5/2023 | Kim | B60W 10/184 |
| | | | 701/43 |
| 2023/0303063 A1* | 9/2023 | Marx | B60T 7/12 |

FOREIGN PATENT DOCUMENTS

| | | | | |
|---|---|---|---|---|
| CN | 113329924 A | * | 8/2021 | B60T 13/662 |
| CN | 112193183 B | * | 4/2022 | B60Q 1/34 |
| CN | 111836745 B | * | 10/2022 | B60T 8/1755 |
| CN | 115339469 A | * | 11/2022 | B60W 10/18 |
| CN | 115959149 A | * | 4/2023 | B60T 13/745 |
| CN | 116135624 A | * | 5/2023 | B60T 1/10 |
| DE | 102012202467 A1 | | 8/2013 | |
| DE | 102013007857 A1 | | 11/2014 | |
| DE | 102017117297 A1 | * | 1/2019 | B60T 8/885 |
| DE | 102018106889 A1 | * | 9/2019 | B60T 8/1755 |
| DE | 102019217043 A1 | | 5/2021 | |
| DE | 112020000597 T5 | * | 10/2021 | B60T 13/662 |
| DE | 102021108523 A1 | * | 10/2022 | B60T 13/588 |
| DE | 102021108524 A1 | * | 10/2022 | B60T 13/662 |
| DE | 102021120719 A1 | * | 11/2022 | B60W 10/18 |
| DE | 102021126228 A1 | * | 4/2023 | B60T 13/745 |
| EP | 3762267 A1 | * | 1/2021 | B60T 8/1755 |
| JP | 7269964 B2 | * | 5/2023 | B60T 13/662 |
| WO | WO-2019170808 A1 | * | 9/2019 | B60T 8/1755 |
| WO | WO-2020158585 A1 | * | 8/2020 | B60T 13/662 |
| WO | WO-2022022254 A1 | * | 2/2022 | B60T 13/745 |

* cited by examiner

METHOD FOR OPERATING A BRAKE SYSTEM, BRAKE SYSTEM AND CONTROL SYSTEM

CROSS-REFERENCE TO RELATED APPLICATION

This application claims priority to German Priority application Ser. No. 102021126228.3, filed Oct. 8, 2021, the disclosure of which is incorporated herein by reference in its entirety.

TECHNICAL FIELD

The disclosure relates to a method for operating a brake system of a vehicle, for example a motor vehicle, for instance a car and utility vehicle, during autonomous driving of the vehicle. The disclosure also relates to a brake system and a control system for an autonomously operable vehicle of this type.

BACKGROUND

Autonomous driving should be understood to mean that the vehicle is substantially permanently controlled exclusively via control electronics of the vehicle, without a driver needing to take over driving tasks. If, in certain situations, driving tasks cannot be controlled by the control electronics, occupants of the vehicle may be requested to take over the control during autonomous driving, or the vehicle may be brought into a safe state without intervention on the part of an occupant.

A method and a control unit for operating a brake system of a vehicle during autonomous driving of the vehicle are known from DE 10 2019 217 043 A1. The vehicle comprises vehicle electronics which are designed to control the vehicle in an autonomous or partially autonomous manner. The vehicle comprises a brake system with an electromechanical brake booster (eBB), a hydraulic block with an electromotively operated hydraulic pump and a control unit, which enable individual brake pressure adjustment at each wheel. The brake system has, with the electromechanical brake booster and the hydraulic block, at least partially mutually redundant actuator units for braking and stabilising the vehicle. If an error occurs, one of the two actuator units should be able to take over the stabilising actuator function of the other in each case.

However, the known method is error-critical in that the vehicle electronics, which control the vehicle in an autonomous or partially autonomous manner and thereby convey a target value for the brake pressure to the brake system, could fail.

SUMMARY

What is needed is a method and a brake system which enable an autonomously driven vehicle to operate with increased safety and which can be provided in a cost-effective and resource-efficient manner.

According to one aspect of the disclosure, a method for operating a brake system of a vehicle during autonomous driving of the vehicle is provided, wherein the presence of status information relating to a driving command unit which controls the autonomous driving is checked by a brake control unit of the brake system. According to the disclosure—if the brake control unit detects that the status information is missing or detects status information which indicates an error of the driving command unit—a control signal which controls the autonomous driving in the longitudinal and/or transverse direction is generated by the brake control unit from current environmental data and/or driving parameters.

The driving command unit is an electrical control unit outside the brake system, which implements a superordinate control of the vehicle in a mutlilayer control and/or regulating system of the vehicle by generating one or more control signals for actuator systems, for instance a drive control unit, a steering control unit and/or a brake system, as a result of evaluating environmental data and/or driving parameters. A respective actuator system brings about autonomous driving of the vehicle by controlling actuators according to the one or more control signals of the driving command unit. As a result of generating a control signal by the brake control unit, autonomous driving may be continued even if the driving command unit fails.

In one exemplary arrangement of the method, if the brake control unit of the brake system detects status information which indicates a functionality of the autonomous driving command unit, a control signal, which is generated by the autonomous driving command unit and controls the autonomous driving in the longitudinal and/or transverse direction, is received and checked by the brake control unit. The checking step prevents actuators of the vehicle, for instance the wheel brake actuators, from being operated according to a faulty control signal.

In one exemplary arrangement of the method, the checking of the control signal which is generated by the autonomous driving command unit involves checking a brake pressure which is requested by the driving command unit against a reference brake pressure which is determined by the brake control unit from driving parameters, and/or determining a rate of change of the control signal. It is therefore ensured that the correct control signal has been received by the driving command unit before it is implemented by the brake system.

In one exemplary arrangement of the method, if the checking of the received control signal reveals limited functionality of the autonomous driving command unit, a control signal which controls the autonomous driving in the longitudinal and/or transverse direction is generated by the brake control unit from current environmental data and/or driving parameters. Checking the control signal by means of the brake control unit therefore enables the functional reliability of the driving command unit, in particular with regard to the generation of plausible control signals, to be checked by a further entity without having to resort to the same hardware of the driving command unit for this purpose.

In one exemplary arrangement of the method, a control signal which controls the autonomous driving in the longitudinal and/or transverse direction is generated independently of signals of the driving command unit by the brake control unit from current environmental data and/or driving parameters. The control signal of the brake control unit is preferably generated without the influence or effect of the driving command unit, which would normally generate the control signal. This means that the brake system, for example by the brake control unit, forms a fallback level for generating a control signal which controls the autonomous driving in the event of a functional limitation or failure of the driving command unit. Without influencing the reliability, the driving command unit may thus be formed without further redundancy. This also means that the driving command unit does not generate a control signal in a redundant manner.

In one exemplary arrangement of the method, from current environmental data and/or driving parameters, the brake control unit generates a control signal according to which the vehicle comes to a standstill at the edge of the road. In this variant of the disclosure, in the event of a failure of the driving command unit, the vehicle, starting from an autonomous driving state, is brought to a safe stopped state by the brake system. In this case, the edge of the road which is to be navigated may be determined by the brake control unit from environmental data.

In one exemplary arrangement of the method, when a control signal which controls the autonomous driving in the longitudinal and/or transverse direction is generated by the brake control unit from current environmental data and/or driving parameters, a warning relating to missing status information and/or limited functionality of the autonomous driving command unit is triggered by the brake control unit. A warning which is perceptible inside and/or outside the vehicle may be generated so that an occupant of the vehicle and/or other road users is/are made aware of the potential danger caused by a functional impairment of the driving command unit.

In one exemplary arrangement of the method, the presence of status information relating to a driving command unit which controls the autonomous driving, and/or the presence of status information of the brake control unit, is checked by a further brake control unit. A redundancy within the brake system is thus used to achieve greater reliability when checking and generating control signals which control the autonomous driving procedure.

For example, a control signal which controls the autonomous driving in the longitudinal and/or transverse direction is generated by the further brake control unit from current environmental data and/or driving parameters if the further brake control unit detects that the status information is missing in both cases or detects status information which indicates an error of the driving command unit and the brake control unit.

In one exemplary arrangement of the method, the generation of the control signal by the brake control unit and/or the further brake control unit involves estimating a wheel speed from a speed signal which is generated outside the brake system and/or estimating a vehicle stability from at least one piece of driving dynamics information which is generated outside the brake system. Therefore, even in the event of a failure of the wheel speed sensor system, a control signal which controls the autonomous driving may be reliably provided by the brake system.

According to a further aspect of the disclosure, a brake system for an autonomously operable motor vehicle comprises at least one brake control unit and wheel actuators, wherein the brake system is designed and intended to receive and to check a control signal, which is generated outside the brake system and controls the autonomous driving of the motor vehicle in the longitudinal and/or transverse direction, and to control the wheel actuators for braking the vehicle individually on the basis of the control signal. If the control signal is not present or if a faulty control signal is detected during the checking procedure, the brake system is designed and intended to generate the control signal, which controls the autonomous driving of the motor vehicle in the longitudinal and/or transverse direction, in particular inside the brake system in place of the driving command unit which was previously controlling the autonomous driving procedure from environmental data and/or driving parameters of the vehicle. Generating the control signal inside the brake system means that the ultimate calculation of the input requirement, which is otherwise implemented by the driving command unit and sent to the brake system, is implemented inside the brake system itself, in particular by one or both brake control units. In this case, environmental data and/or driving parameters which are determined outside the brake system may be processed as input values.

According to a further aspect of the disclosure, a control system for an autonomously operable motor vehicle comprises a driving command unit and a brake system, which is designed according to the disclosure, wherein the driving command unit is designed and intended to generate a control signal which controls the autonomous driving of the motor vehicle in the longitudinal and/or transverse direction from current environmental data and/or driving parameters of the motor vehicle in an autonomous mode and to supply the control signal to the brake system. The brake system is designed and intended to identify an error of the driving command unit and to generate the control signal as an alternative if the error is identified.

In one exemplary arrangement, one driving command unit is provided, which is designed without inherent redundancy with regard to the generation of the control signal. The control signal for the brake system is optionally generated by the one driving command unit or a brake control unit of the brake system.

In one exemplary arrangement, the brake system comprises two brake control units, which are designed and intended to identify an error of the driving command unit and the other brake control unit in each case and to generate the control signal as an alternative if the error of the driving command unit and the other brake control unit in each case is identified.

The disclosed brake system, for example the control unit(s) of the brake system, is/are designed and intended to implement the disclosed method.

In this regard, the disclosure may also be realized by a computer program, which prompts a brake system of an autonomously operable vehicle to implement the disclosed method, and/or which comprises a program code in order to implement the disclosed method when the computer program is executed in a processor of the vehicle, for example in a control unit of the brake system.

For example, the brake system and/or the control system according to the disclosure comprises at least one processor and the computer program according to the above-mentioned aspect of the disclosure.

One or more feature combinations of the disclosure realise one or more of the following advantages: The safety of an autonomously driven vehicle is increased. Braking is also possible in the event of a failure of the driving command unit. A safe state of an autonomously driven vehicle is achieved, even if the driving command unit fails. The driving command unit does not have to be configured with multiple redundancies since one or more other components of a control system, namely the inventive brake system, take over the tasks of the driving command unit.

BRIEF DESCRIPTION OF DRAWINGS

Further features, advantages and properties of the disclosure are explained with the aid of the description of exemplary arrangements of the disclosure, with reference to the figures, in which.

DETAILED DESCRIPTION

Figure 1:
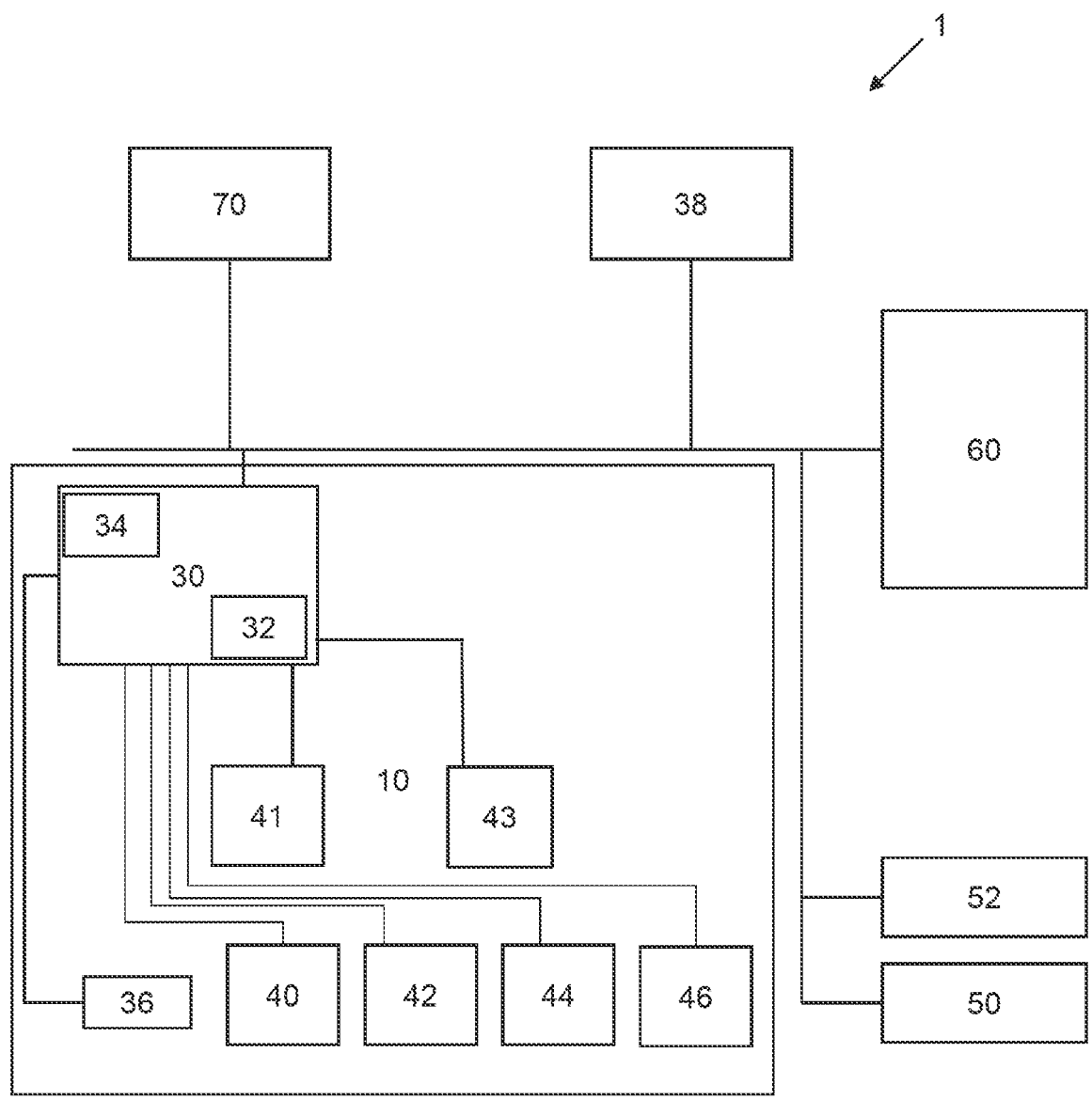
FIG. 1: shows a schematic view of a first exemplary arrangement of a control system for implementing the method according to the disclosure.

FIG. 1 shows a simplified block diagram of a first exemplary configuration of a control system 1 for an autonomously operable vehicle. The control system 1 comprises a brake system 10, which is operated according to an exemplary configuration of the disclosed method.

A driving command unit 60, a driving dynamics sensor system 38 outside the brake system, a human/machine interface 70, a vehicle speed reference sensor system 50 and a drive motor speed sensor system 52 are connected to the brake system 10 as further components of the control system 1.

The control system 1 and the driving command unit 60 receive environmental data and driving parameters of the vehicle from sensors (not illustrated in more detail). The environmental data and driving parameters of the vehicle may also be received by further components of the control system 1, for instance the brake system 10. On the basis of the environmental data and driving parameters of the vehicle, the driving command unit 60 generates a control signal as soon as autonomous driving of the vehicle is activated, which control signal controls the vehicle in the longitudinal and/or transverse direction during the autonomous driving procedure. The control signal comprises for example a braking-effect and/or brake-pressure request, a steering angle request and/or an acceleration request. In individual configurations, an abstract control signal, for instance a stop request, may be generated by the driving command unit 60.

The driving command unit 60 transmits status information in a cyclical manner, which information indicates the functional reliability of the driving command unit 60 to other components of the control system 1. Further components of the control system 1 may also be designed to exchange status information in a cyclical manner during error-free operation of the control system 1 or the respective components, which information is used by the other components of the control system in each case to evaluate the functionality of the components to which the status information relates.

The brake system 10 comprises an electro-hydraulic brake control unit 30, for instance a driving dynamics or ESP control unit, wheel brake actuators 41, 43 for a parking brake, wheel brake actuators 40, 42, 44, 46 for a service brake and a wheel speed sensor system 36, which comprises a plurality of wheel speed sensors which are individually associated with the wheels of the vehicle.

The brake control unit 30, the control system 1 and the components thereof have hydraulic and electrical communications interfaces (not illustrated in more detail) for exchanging hydraulic signals between components of the brake system 10 and electrical signals with the control system 1 and other components of the vehicle. In the schematic FIGS. 1 and 2, only a few essential connections between the components of the control system 1 are shown, which, within the respective context, refer to the transmission of information by electrical signals, for example by a communications bus system, and/or the transmission of hydraulic fluid, as revealed in the further description.

The electro-hydraulic brake control unit 30 comprises a hydraulic block and a driving dynamics control unit 32, which controls valves of the hydraulic block according to a control signal—present in the vehicle dynamics control unit 32—for the vehicle braking effect to be achieved, taking into account the current driving situation. The driving dynamics control unit 32 receives information for example from the wheel speed sensor system 36 and a driving dynamics sensor system 34, which is integrated in the brake control unit, from which information the driving stability of the vehicle in the longitudinal and/or transverse direction is determined and is reproduced by controlling the wheel brake actuators 40, 42, 44, 46 individually for each wheel for service braking, and/or the wheel brake actuators 41, 43 for parking braking, as soon as an unstable driving state is determined. The individual control for each wheel takes place via the driving dynamics control unit 32, taking into account the superordinate control and/or regulation of the vehicle according to a control signal which generally controls the autonomous driving in the longitudinal and/or transverse direction. The control signal is generated by the driving command unit 60 in the case of an error-free control system.

The brake system 10 receives the status information transmitted by the driving command unit 60 in a cyclical manner and evaluates this information. If the evaluation of the status information reveals an adequate functionality of the driving command unit 60, the brake system 10 switches to a state in which the control signal is received and checked by the driving command unit 60. To check the control signal of the driving command unit 60, the brake unit 10 evaluates current driving parameters for example—such as speed, steering angle, yaw rate, wheel slip—and/or environmental data of the vehicle—such as a distance from a vehicle in front, the speed of a vehicle in front, a road curvature determined by a camera system and/or weather data—and validates the present control signal of the driving command unit 60 with regard to the current driving parameters and/or environmental data.

For validation purposes, a present control signal may be compared to earlier control signals implemented with the same driving parameters and/or environmental data. Alternatively or additionally, for validation or checking purposes, the present control signal is compared to a reference control signal, which is determined by the brake system 10 on the basis of an, for example simplified, vehicle and environmental model and/or driving dynamics model. Alternatively or additionally, for validation or checking purposes, a time progression of the control signal which is received by the brake system 10 is evaluated with regard to its waveform and/or value range, e.g. using the following criteria: continuity, frequency, maximum and/or minimum amplitude of the requested total brake pressure.

If the checking of the control signal by the brake system 10 reveals adequate functionality of the driving command unit 60 and/or plausibility of the control signal, the brake system 10 controls the wheel brake actuators 40, 42, 44, 46, 41, 43 for autonomous control of the vehicle in the longitudinal and/or transverse direction according to the control signal of the driving command unit 60.

If the checking of the status signal and/or the control signal of the driving command unit 60 by the brake system 10 reveals a limited, in particular inadequate functionality of the driving command unit 60 according to a predetermined safety criterion, the brake system 10 generates a control signal which is suitable for at least temporarily continuing and controlling the autonomous driving of the vehicle in the longitudinal and/or transverse direction. Likewise, a control signal is generated by the brake system 10 if the brake system 10 does not receive status information from the driving command unit 60 within a predetermined time period.

The control signal which is generated by the brake system 10 is used by the brake system 10 to control the wheel brake actuators 40, 42, 44, 46, 41, 43 for continuing the autonomous driving of the vehicle according to the control signal. To generate the control signal, the brake system 10 uses those components of the control system 1 whereof the status information indicates an adequate functionality. Therefore all or only some of the environmental data and/or driving parameters which have been used by the driving command unit 60 to generate a control signal may also be used by the brake system 10 in order to generate the control signal. Therefore, in the event of a failure of the wheel speed sensor system 36 of the brake system 10, for example, an estimation of wheel speeds and/or the speed of the vehicle may be determined on the basis of a vehicle speed reference sensor system 50 outside the brake system and/or a drive motor speed sensor system 52.

In one exemplary configuration of the method, the control signal is a brake pressure request, which is generated in the event of an error of the brake control unit 10 with the stipulation that the vehicle is to be brought to a stop within a predetermined time period in order to end the autonomous driving procedure. In @ one exemplary configuration, the brake system 10, in the event of an error, generates a control signal which ends the autonomous driving of the vehicle in that the vehicle comes to a standstill at the edge of the road within a predetermined time period. To this end, the control signal 10 is generated by the brake system 10 such that the wheel brake actuators for service braking 40, 42, 44, 46 and/or the wheel brake actuators for parking braking 41, 43 are controlled individually in such a way that the vehicle slows down and is steered to the edge of the road as a result of different wheel speeds. Moreover, by controlling the hazard warning lights and an acoustic signal generator, a warning is generated outside the vehicle.

If the wheel brake actuators 40, 42, 44, 46 are controlled by the brake system 10 for controlling the autonomous driving according to a control signal of the wheel brake actuators 40, 42, 44, 46, the parking brake actuators 41, 43 may be controlled alternatively or in addition to individual wheel brake actuators 40, 42, 44, 46 or a plurality of wheel brake actuators 40, 42, 44, 46. When selecting the actuators which are to be controlled, status information of the wheel brake actuators 40, 42, 44, 46 for service braking and wheel brake actuators 41, 43 for parking braking may be taken into account.

Figure 2:
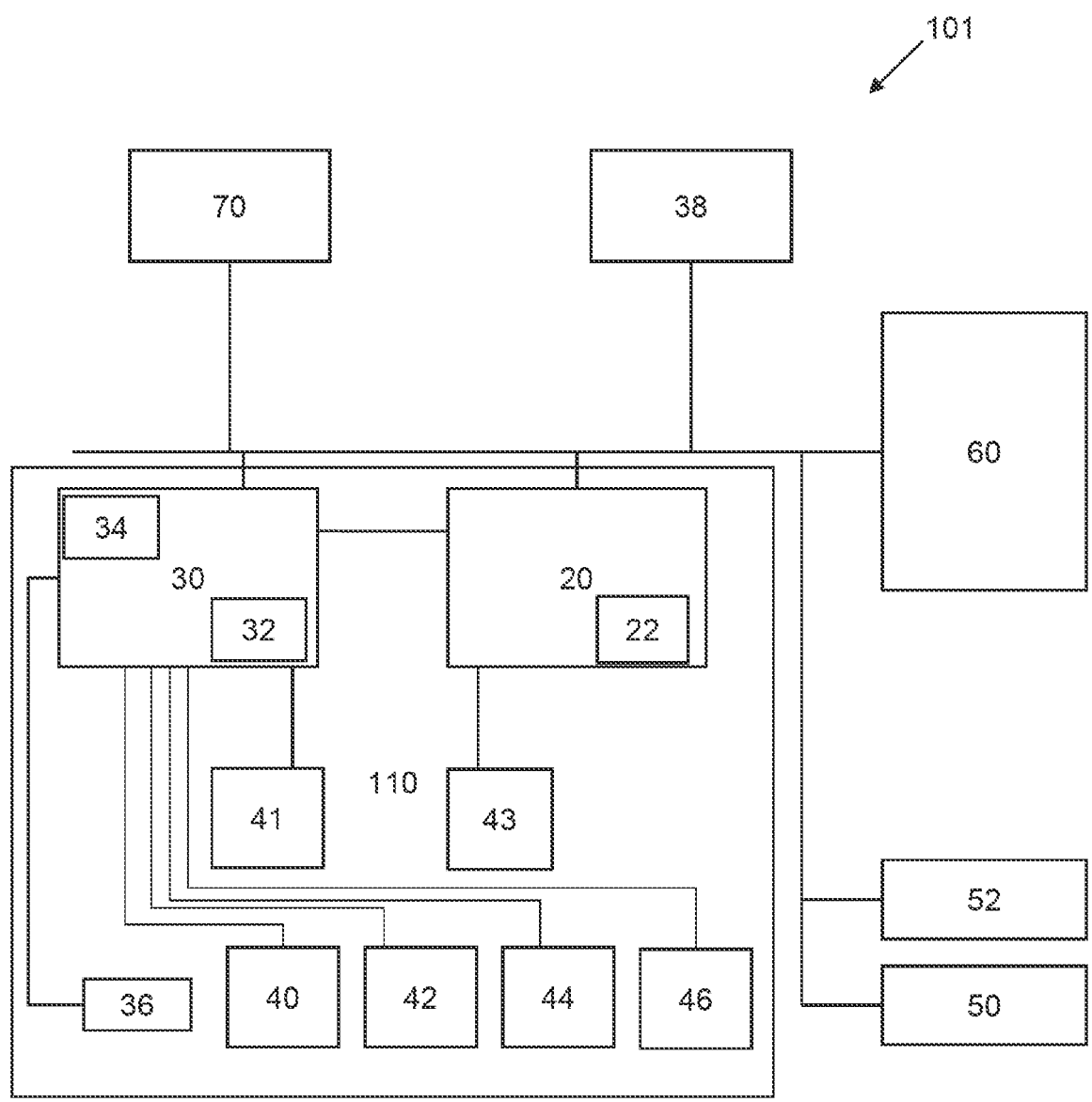
FIG. 2 shows a schematic view of a second exemplary arrangement of a control system for implementing the method according to the disclosure.

A further exemplary configuration of a control system 101 is shown in FIG. 2, which, with the exception of the additions and differences described below, functions in the same manner as the control system 1 according to FIG. 1 and implements the method in the same way, which is why the same reference signs have been used for the same components.

The control system 101 differs from the control system 1 solely in terms of the brake system 110. The brake system 110 in turn comprises all components of the brake system 10 described above and may therefore execute the method described above in the same way. The brake system 110 differs from the brake system 10 only in that a further brake control unit 20 with a further control unit 22 is provided in addition to the electro-hydraulic brake control unit. The further brake control unit 20 is electrically and/or hydraulically connected to the electro-hydraulic brake control unit 30 such that this may at least temporarily take over the control of the wheel brake actuators 40, 42, 44, 46 and/or the brake actuators 41, 43 for parking braking. As shown in FIG. 2, the further brake control unit 20 may be configured such that one of the parking brake actuators 41, 43 is controlled directly via this brake control unit 20. According to a variant (not illustrated) of the configuration in FIG. 2, the parking brake actuators 41, 43 may also be controlled directly by the electro-hydraulic brake control unit 30, as shown in FIG. 1.

In one exemplary arrangement, the further brake control unit 20 is an electromechanical brake booster, by which immediate hydraulic control of the wheel brake actuators 40, 42, 44, 46 for braking the vehicle is at least temporarily possible. In one exemplary variant of this configuration, the electromechanical brake booster operates without pedals, i.e. without a mechanically supporting or supported brake force which can be applied to a master cylinder of the brake system by a driver, and is in particular configured without an option for manual brake force generation, for instance without a pedal.

With the aid of the further brake control unit 20, the receiving and checking of the status information of the driving command unit 60 can be implemented redundantly both by the electro-hydraulic brake control unit 30 and by the brake control unit 30.

The driving dynamics sensor system 38 is provided in addition to the driving dynamics sensor system of the brake system 10. In particular, the driving dynamics sensor system 38 is formed by a sensor cluster, which comprises acceleration sensors in all three spatial directions and rate-of-rotation sensors for a rotation about all three spatial directions, for example. In some configurations, the driving dynamics sensor system 38 or driving dynamics signals from an airbag control unit of the vehicle may be supplied as required to the control system 1, 101 and all components of the control system 1, 101.

By the human/machine interface 70, a control signal which is superordinate to all control signals of the control system 1, 101 may be generated during autonomous driving of the vehicle, which superordinate control signal indicates an occupant-generated stop request and/or abort command relating to the autonomous operating mode of the vehicle and is processed by the brake system 10, 110.

To realise the vehicle speed reference sensor system 50, one or more of the following may be provided: determining the vehicle speed on the basis of information from the vehicle's satellite navigation system, determining the vehicle speed on the basis of information from the vehicle's LIDAR sensor system, radar sensor system, ultrasound sensor system, the driving dynamics sensor system 38, a speed sensor system, for instance the drive motor speed sensor system 52 or the wheel speed sensor system 36, and/or a camera system.

All method steps which relate to receiving, generating and/or processing electronic signals and/or data by the brake system 10, 110 are implemented by the respective brake control unit, i.e. the driving dynamics control unit 32 in the case of the brake system 10, or, in the configuration of FIG. 2, optionally by the driving dynamics control unit 32 and the control unit 22 of the electromechanical brake booster 20, whether in a redundant manner or in that the implementation of method steps is shared between the two control units 32, 22.

Isolated features may also be extracted as required from the feature combinations disclosed in the present case and, by eliminating a structural and/or functional connection which is possibly present between the features, may be used in combination with other features to define the subject matter of a claim. The sequence and/or number of steps of the method may be varied. The methods may be combined with one another, for example to create an overall method.

The invention claimed is:

1. A method for operating a brake system of a vehicle during autonomous driving of the vehicle, wherein
   a) a presence of status information relating to a driving command unit which controls the autonomous driving is checked by a one brake control unit of the brake system; and wherein
   b) if the brake control unit detects that the status information is missing or detects status information which indicates an error of the driving command unit,
   a control signal which controls the autonomous driving in a longitudinal and/or transverse direction is generated by the brake control unit from current environmental data and/or driving parameters.

2. The method according to claim 1, wherein, if the brake control unit detects status information which indicates a functionality of the autonomous driving command unit, a control signal, which is generated by the autonomous driving command unit and controls the autonomous driving in the longitudinal and/or transverse direction, is received and checked by the brake control unit.

3. The method according to claim 2, wherein, if the checking of the received control signal reveals limited functionality of the autonomous driving command unit,
   a control signal which controls the autonomous driving in the longitudinal and/or transverse direction is generated by the brake control unit from current environmental data and/or driving parameters.

4. The method according to claim 2, wherein the checking of the control signal which is generated by the autonomous driving command unit involves checking a brake pressure which is requested by the autonomous driving command unit against a reference brake pressure which is determined by the brake control unit from driving parameters, and/or determining a rate of change of the control signal.

5. The method according to claim 1, wherein a control signal which controls the autonomous driving in the longitudinal and/or transverse direction is generated independently of signals of the driving command unit by the brake control unit from current environmental data and/or driving parameters.

6. The method according to claim 1, wherein from current environmental data and/or driving parameters, the brake control unit generates a control signal according to which the vehicle comes to a standstill at the edge of the road.

7. The method according to claim 1, wherein when a control signal which controls the autonomous driving in the longitudinal and/or transverse direction is generated by the brake control unit from current environmental data and/or driving parameters, a warning relating to missing status information and/or limited functionality of the autonomous driving command unit is triggered by the brake control unit.

8. The method according to claim 1, wherein the presence of status information relating to a driving command unit which controls the autonomous driving, and/or the presence of status information of the brake control unit, is checked by a further brake control unit, wherein
   if the further brake control unit detects that the status information is missing in both cases or detects status information which indicates an error of the driving command unit and the brake control unit,
   a control signal which controls the autonomous driving in the longitudinal and/or transverse direction is generated by the further brake control unit from current environmental data and/or driving parameters.

9. The method according to claim 1, wherein the generation of the control signal by the brake control unit and/or the further brake control unit involves estimating a wheel speed from a speed signal which is generated outside the brake system and/or estimating a vehicle stability from at least one piece of driving dynamics information which is generated outside the brake system.

10. The method according to claim 3, wherein the checking of the control signal which is generated by the autonomous driving command unit involves checking a brake pressure which is requested by the autonomous driving command unit against a reference brake pressure which is determined by the brake control unit from driving parameters, and/or determining a rate of change of the control signal.

11. The method according to claim 10, wherein a control signal which controls the autonomous driving in the longitudinal and/or transverse direction is generated independently of signals of the driving command unit by the brake control unit from current environmental data and/or driving parameters.

12. The method according to claim 11, wherein from current environmental data and/or driving parameters, the brake control unit generates a control signal according to which the vehicle comes to a standstill at the edge of the road.

13. The method according to claim 12, wherein when a control signal which controls the autonomous driving in the longitudinal and/or transverse direction is generated by the brake control unit from current environmental data and/or driving parameters, a warning relating to missing status information and/or limited functionality of the autonomous driving command unit is triggered by the brake control unit.

14. The method according to claim 1, wherein the presence of status information relating to a driving command unit which controls the autonomous driving, and/or the presence of status information of the brake control unit, is checked by a further brake control unit, wherein
   if the further brake control unit detects that the status information is missing in both cases or detects status information which indicates an error of the driving command unit and the brake control unit,
   a control signal which controls the autonomous driving in the longitudinal and/or transverse direction is generated by the further brake control unit from current environmental data and/or driving parameters.

15. The method according to claim 14, wherein the generation of the control signal by the brake control unit and/or the further brake control unit involves estimating a wheel speed from a speed signal which is generated outside the brake system and/or estimating a vehicle stability from at least one piece of driving dynamics information which is generated outside the brake system.

16. A brake system for an autonomously operable motor vehicle, comprising at least one brake control unit and a plurality of wheel actuators, wherein the brake system is designed to receive and to check a control signal, which is generated outside the brake system and controls autonomous driving of the motor vehicle in a longitudinal and/or transverse direction, and to control the wheel actuators for braking the vehicle individually on the basis of the control signal, wherein the brake system is designed to generate the control signal, which controls the autonomous driving of the motor vehicle in the longitudinal and/or transverse direction, inside the brake system from environmental data and/or driving parameters of the vehicle.

17. A control system for an autonomously operable motor vehicle, comprising a driving command unit and a brake system comprising at least one brake control unit and a plurality of wheel actuators, wherein a driving command unit is designed to generate a control signal which controls autonomous driving of the motor vehicle in a longitudinal and/or transverse direction from current environmental data and/or driving parameters of the motor vehicle in an autonomous mode and to supply a control signal to the brake system, wherein the brake system is designed and intended to identify an error of the driving command unit and to generate the control signal as an alternative if the error is identified.

18. The control system according to claim 17, wherein precisely one driving command unit is provided.

19. The control system according to claim 17, wherein the brake system comprises two brake control units, which are designed to identify an error of the driving command unit and the other brake control unit in each case and to generate the control signal as an alternative if the error of the driving command unit and the other brake control unit in each case is identified.

20. The control system according to claim 18, wherein the brake system comprises two brake control units, which are designed to identify an error of the driving command unit and the other brake control unit in each case and to generate the control signal as an alternative if the error of the driving command unit and the other brake control unit in each case is identified.

\* \* \* \* \*